(12) United States Patent
Kähkipuro et al.

(10) Patent No.: US 6,305,501 B1
(45) Date of Patent: Oct. 23, 2001

(54) ELEVATOR RELUCTANCE LINEAR MOTOR DRIVE SYSTEM

(75) Inventors: Matti Kähkipuro, Hyvinkää; Raimo Pelto-Huikko, Vantaa; Antti Kallioniemi, Helsinki, all of (FI)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 09/446,063
(22) PCT Filed: Jun. 18, 1998
(86) PCT No.: PCT/FI98/00531
§ 371 Date: Mar. 14, 2000
§ 102(e) Date: Mar. 14, 2000
(87) PCT Pub. No.: WO98/58866
PCT Pub. Date: Dec. 30, 1998

(30) Foreign Application Priority Data
Jun. 19, 1997 (FI) ........................ 972635

(51) Int. Cl.[7] .................................. B66B 1/06
(52) U.S. Cl. ............................ 187/289; 187/250
(58) Field of Search ........................ 187/289, 250, 187/251, 409; 318/135, 701; 310/12–14; 104/290, 292, 293

(56) References Cited

U.S. PATENT DOCUMENTS

| | | | |
|---|---|---|---|
| 3,631,806 | * 1/1972 | Barthalon | 104/89 |
| 3,802,349 | * 4/1974 | Guimbal | 310/13 |
| 3,827,371 | * 8/1974 | Onoda | 318/135 |
| 3,912,992 | * 10/1975 | Lamb | 318/135 |
| 4,678,971 | 7/1987 | Kanazawa et al. | |
| 5,090,516 | * 2/1992 | Grinaski et al. | 187/112 |
| 5,141,082 | * 8/1992 | Ishii et al. | 187/110 |
| 5,158,156 | * 10/1992 | Okuma et al. | 187/17 |
| 5,174,416 | * 12/1992 | Sakabe et al. | 310/12 |
| 5,183,980 | 2/1993 | Okuma et al. | |
| 5,203,432 | * 4/1993 | Grinaski | 187/94 |
| 5,288,956 | * 2/1994 | Kadokura et al. | 187/112 |
| 5,297,658 | * 3/1994 | Grinaski et al. | 187/94 |
| 5,299,662 | * 4/1994 | Reddy et al. | 187/94 |
| 5,400,204 | * 3/1995 | Oshima et al. | 187/289 |
| 5,547,059 | * 8/1996 | Watanabe et al. | 187/289 |
| 5,579,869 | * 12/1996 | Ishii et al. | 187/289 |
| 5,668,421 | 9/1997 | Gladish | |
| 5,751,076 | * 5/1998 | Zhou | 310/12 |
| 5,793,179 | * 8/1998 | Watkins | 318/701 |
| 5,828,195 | * 10/1998 | Zalesski | 318/366 |
| 6,137,195 | * 10/2000 | Chitayat | 310/12 |

FOREIGN PATENT DOCUMENTS 4305274 1/1994 (DE).

* cited by examiner

*Primary Examiner*—Jonathan Salata
(74) *Attorney, Agent, or Firm*—Birch, Stewart, Kolasch & Birch, LLP

(57) ABSTRACT

A drive system for an elevator includes a drive machine by means of which the for moving and supporting an elevator car. The primary circuit of a linear motor is permanently fitted to a wall of a building while its secondary circuit is fitted in conjunction with the elevator car and moves with the elevator car. Pressurized air is supplied between the primary and secondary circuits of the reluctance-type linear motor to maintain an air gap between them.

12 Claims, 5 Drawing Sheets

ELEVATOR RELUCTANCE LINEAR MOTOR DRIVE SYSTEM

This application is the national phase under 35 U.S.C. §371 of PCT International Application No. PCT/FI98/00531 which has an International filing date of Jun. 18, 1998, which designated the United States of America.

The present invention relates to an elevator and in particular, to a drive system for an elevator.

DESCRIPTION OF THE BACKGROUND ART

In elevator technology, several methods are used to produce the motive power for elevators. A common method is to use a traction sheave connected to a rotating motor hoisting the elevator car by means of ropes, with a counterweight placed on the opposite side of the traction sheave to balance the load. Another established solution is found in hydraulic elevators, in which the hoisting power to move the car is obtained from hydraulic cylinders either directly or via ropes. Most modern elevators are based on these solutions, of which many variations have been developed.

Although the above-mentioned elevator types have become established and are safe and reliable in operation, the solutions used in them comprise several factors that are objections of improvement and product development. For example, investigations are continuously being made to find ways of more effective utilisation of building space and reduction of energy consumption. For hydraulic elevators, the hoisting height is in practice limited to a few floors. By contrast, elevators with rope suspension have been installed in buildings as high as several hundred meters, in which case rope elongation and oscillation cause problems. Because of the rope suspension arrangements, the number of elevators in a shaft is practically limited to one.

In addition to rope-suspended and hydraulic elevators, several solutions for the use of a linear motor in an elevator have been proposed. In this case the electric motor is completely located in the shaft space. Most linear elevator motors have been based on the induction motor principle, although other motor types, such as a linear motor based on permanent magnets have also been presented. Several different solutions have been proposed, but as yet it has not been possible to produce a competitive elevator.

SUMMARY OF THE INVENTION

The object of the present invention is to achieve a new elevator in which several drawbacks encountered in prior art solutions are avoided.

The invention is based on a so-called switched reluctance linear motor or a variant developed from it, which makes use of the so-called microflux technique. In the switched reluctance motor, the windings of the linear motor are optionally placed either in a fixed primary circuit or in a movable secondary circuit. The motor is used to both move the car and support it by generating a force component in the direction of motion and a force component perpendicular to the direction of motion. The placement of the winding on the primary or secondary side can be selected separately for each application.

According to a preferred embodiment of the invention it is utilised the combined effect of a linear motor and pneumatic air gap regulation. The linear motor is used to both move the car and support it by generating a force component in the direction of motion and a force component perpendicular to the direction of motion. The air gap between the primary and secondary circuits of the linear motor is maintained by means of the perpendicular component and pressurised air.

According to a preferred embodiment of the invention, in a motor based on the microflux technique, called microflux motor, the windings are placed on both the primary and secondary sides, thus reducing the proportion of leakage flux and improving the power-to-weight ratio of the motor. The supply of current to the windings is so controlled that the magnetic flux will only pass through a minimal distance in the yoke part of the motor and that the flux loop will be completed in the first place via adjacent teeth.

According to a preferred embodiment, the power is supplied to the windings using control equipment disposed along the entire length of the track of the elevator and each winding is controlled separately. Alternatively, several windings can be combined to form a group with common control.

According to another alternative implementation of the invention, the pneumatic equipment comprises a source of pressurised air and a pipe system with nozzles, fitted substantially in the air gap between the primary and secondary circuits of the linear motor. The pressurised air keeps the air gap clean and generates a smooth air flow from the center of the air gap towards its edges.

The alternatives regarding the structural solutions of the invention are to dispose the linear motor and pneumatic equipment on one side of the elevator car or to dispose the linear motor and pneumatic equipment on two or more sides of the elevator car. The former solution provides more freedom regarding the placement of the elevator in the building and an independence of a traditional elevator shaft. The latter solution allows more freedom of variation of the physical dimensions of the elevator-specific motor.

In an embodiment of the invention relating especially to the structure of the linear motor, the tooth pitch of the primary and secondary circuits is effected by applying the vernier principle. The motor power can thus be uniformly distributed over the entire length of the active part of the motor, i.e. the movable secondary side.

According to a further embodiment, the primary circuit and/or secondary circuit is coated with a plastic film on the surface facing the air gap. The effective air gap of the linear motor can thus be adjusted without increasing the pneumatically regulated air gap at the same time.

The new type of motor solution of the invention provides several advantages in elevator technology. As the motor applies a lifting force directly to the elevator car, it eliminates the need for hoisting ropes, which are an object of regular maintenance and renewal. Readjustments due to rope elongation naturally become unnecessary. Correspondingly, no traction sheave and no diverting pulleys need to be installed. The counterweight and associated shaft equipment, such as counterweight guide rails, become superfluous. No separate machine room is needed, but the control and operating equipment can be placed in the elevator or in conjunction with the equipment at the landings. The travel of the elevator car in the elevator shaft is controlled by a pneumatic bearing system, so there are no conventional car guides and guide rails installed for them. Safety gears as used in current technology are also left out. The overall degree of utilisation of the elevator shaft is higher because the only equipment that needs to be installed in the elevator shaft in addition to the elevator car is the very flat magnetic circuits of the motor. The lifting height is unlimited without any special additional equipment or rigging necessitated by height.

The elevator can be implemented as a external installation in which the elevator climbs along the external wall of the building, thus allowing a further space saving inside the building. In the elevator solution of the invention it is further possible to use a light car construction because the magnitude of the friction does not limit the minimum car weight as in the case of traction sheave elevators. Based on the degrees of freedom of the elevator of the invention and the limitations of conventional elevators, this new solution provides advantages especially in the case of very high and very short elevator shafts. Furthermore, the elevator solution of the present invention makes it possible to develop multiple-car elevator shafts and also transport systems combining vertical and horizontal movement.

The switched reluctance motor has a considerably higher power-to-weight ratio than conventional motor solutions. In the microflux motor, the power-to-weight ratio can be further improved as compared even with the reluctance motor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be described in detail by the aid of some of its embodiments by referring to the attached drawings which are given by way of illustration only, and thus are not limitative of the present invention, and in which.

DETAILED DESCRIPTION OF THE PREFERRED EMBODIMENT

Figure 1:
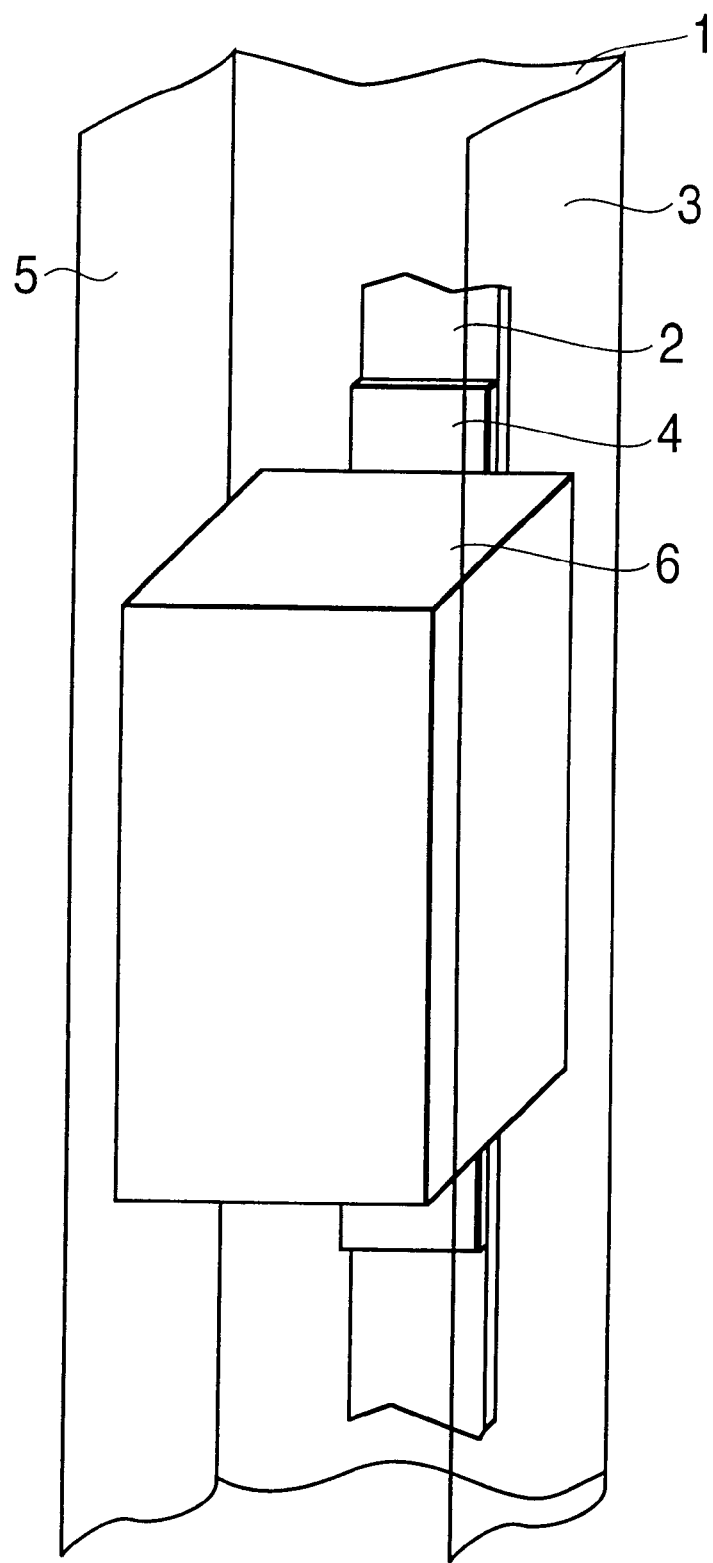
FIG. 1 illustrates the principle of the elevator of the invention.

The elevator of the invention (FIG. 1) moves along the surface of the primary circuit, i.e. stator 2 of a linear motor attached to a wall 1 of an elevator shaft fitted in a building. Although in FIG. 1 the elevator is depicted as moving in a shaft delimited by walls 1, 3 and 5, the implementation of the invention is not limited to a shaft, but instead the elevator, supported by its motor, can move along its stator, which is attached to the wall 1 or otherwise reliably fixed to the building, without side walls. A movable slide 4 with the secondary circuit, i.e. rotor of the linear motor fitted to it is attached to the elevator car 6 and it moves alongside the stator 2, separated from it by an air gap, as described in more detail later on.

Figure 2A:
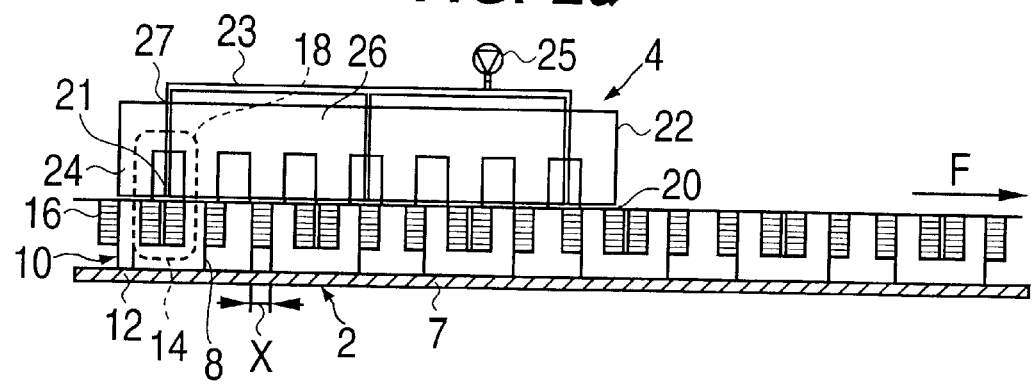
FIGS. 2a and 2b illustrate the principle of a switched reluctance motor, showing the motor as seen in side view and from the side of the air gap.
Figure 2B:
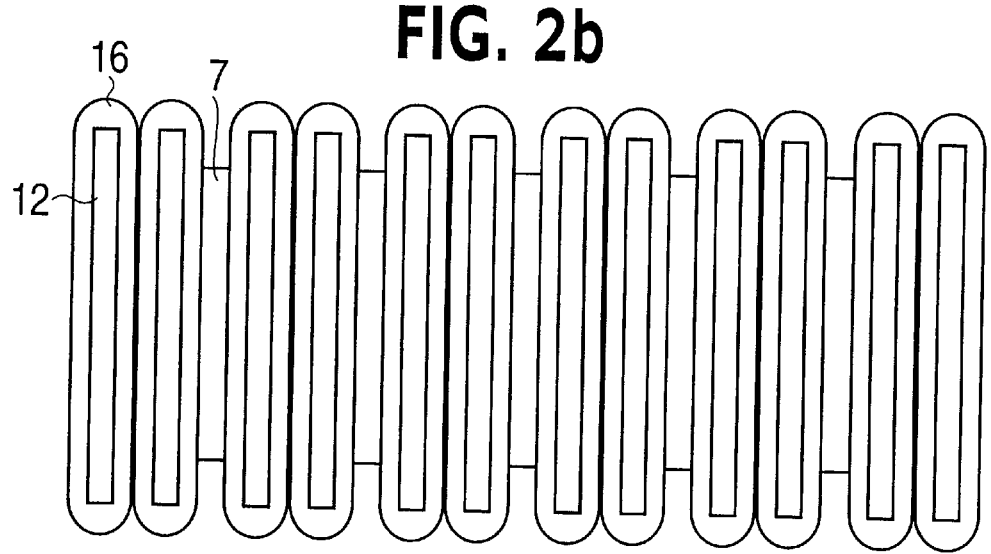

As illustrated by FIGS. 2a and 2b, the stator 2 comprises a plurality of component stators 8 attached to a supporting structure 7 of the stator and comprising a magnetic circuit 10 with teeth 12 pointing toward the rotor and a yoke part 14 connecting the teeth. The iron structure is substantially of the same order of thickness in the area of both the teeth and the yoke. Wound around the stator teeth 12 are coils 16, and the current flowing in the coils generates a magnetic flux 18 passing via the teeth and the yoke part and further across the air gap 20 into the magnetic circuit 22 of the rotor fitted to the slide. The magnetic circuit 22 of the rotor consists of rotor teeth 24 and a yoke part 26 connecting adjacent rotor teeth 24. In the embodiment presented in FIG. 2a, the slot pitch of the component stators is identical with the slot pitch of the rotor, so the teeth of a given component stator are aligned with the rotor teeth opposite the component stator. Adjacent component stators have been removed through distance x in the direction of motion of the slide, which in the example in FIG. 2a corresponds to ⅛ of the rotor slot pitch. Between the rotor and the stator, a force is developed which has a force component $F_x$ acting in the direction of the yoke of the slide, i.e. in the direction of motion, and a force component $F_y$ acting in a direction perpendicular to the direction of motion and attracting the rotor and stator to each other when a current is passed through the coil under appropriate control as described in detail below. The slide is provided with air channels 27. At one end, the air channels terminate in a nozzle 21 in the air gap 20 of the motor and at the other end they are connected to a pipe system 23 with a pneumatic pressure source 25 connected to it. The entire pneumatic equipment can be mounted on the elevator car, in which case its drive motor is powered via a car cable or supply rails. Alternatively, the pneumatic pressure source can be immovably mounted in the building, in which case a pipe system 23 is provided under/beside the track of the elevator in a manner corresponding to a car cable. Using the pneumatic equipment, pressurised air is supplied into the air gap 20 of the motor so that the attractive force between the stator and rotor is cancelled and a constant air gap is maintained. The stator and rotor surfaces facing the air gap are of a smooth shape to ensure that the pressurised air is distributed in the air gap uniformly enough to maintain a constant air gap magnitude. The spaces between the stator windings and slots are filled with resin or some other material known in the art. Correspondingly, the slots between the rotor teeth are filled with resin or some other non-magnetic filler. Thus, the magnetic circuit consists of the stator and rotor teeth and the yoke parts connecting the teeth as well as the air gap between the stator and rotor.

An essential factor about the switched reluctance motor is that the magnetic flux must be so controlled that it will pass through two adjacent teeth and the yoke part connecting them on both the stator side and the rotor side. This ensures that the path of the magnetic flux is short and no massive iron frame is needed. In a rotor as shown in FIG. 2, placing the stator windings close to the air gap substantially reduces the stray flux, but some stray flux still appears on the side of the rotor teeth. To reduce the stray flux, in the alternative presented in FIG. 3, coils 28 have been wound around the rotor teeth 24 as well. Where applicable, the same reference numbers are used in FIG. 3 as in FIG. 2 for corresponding parts. In the microflux motor according to the embodiment illustrated by FIG. 3, 'microflux motor' being the designation used for this alternative in this context, the displacement x of the component stators of the stator is 1/21 of the rotor slot pitch. Thus, there are twenty stator teeth for a length of 21 teeth of the entire rotor. In this manner, applying the vernier principle, a smoothness of the lifting force is achieved, which will be discussed in a later paragraph in conjunction with FIG. 4. The magnetic circuit of the stator in the microflux motor presented in FIG. 3 comprises a continuous yoke provided with teeth in accordance with the slot pitch. Thus, the embodiments illustrated by FIGS. 2 and 3 differ structurally from each other and their control principles differ correspondingly from each other in certain details. In each embodiment, however, power is supplied to the stator windings in such a way that the main flux generated by each winding completes its loop via the tooth adjacent to the winding and does not pass further through the yoke. In the case illustrated by FIG. 3, the power supplied to the rotor windings serves to reduce the stray flux.

Figure 3A:
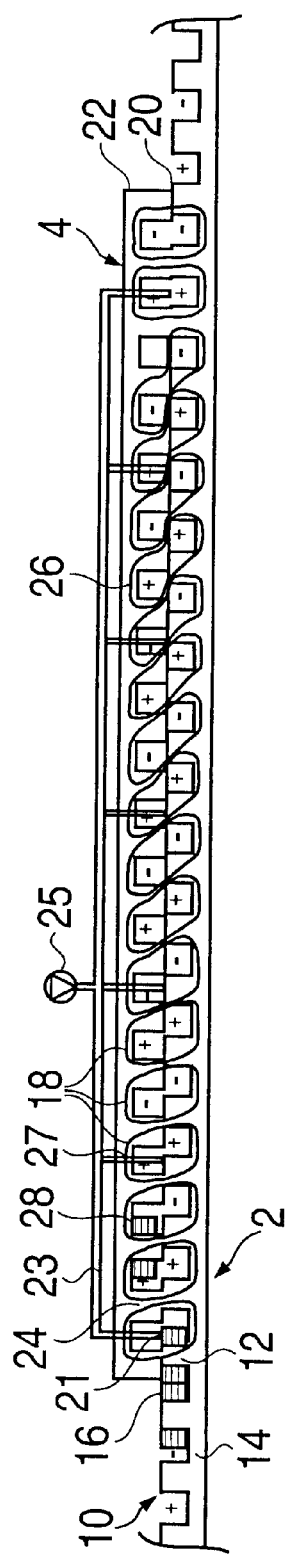
FIGS. 3a and 3b illustrate the principle of a microflux motor, showing the motor in lateral view and from the side of the air gap.
Figure 3B:
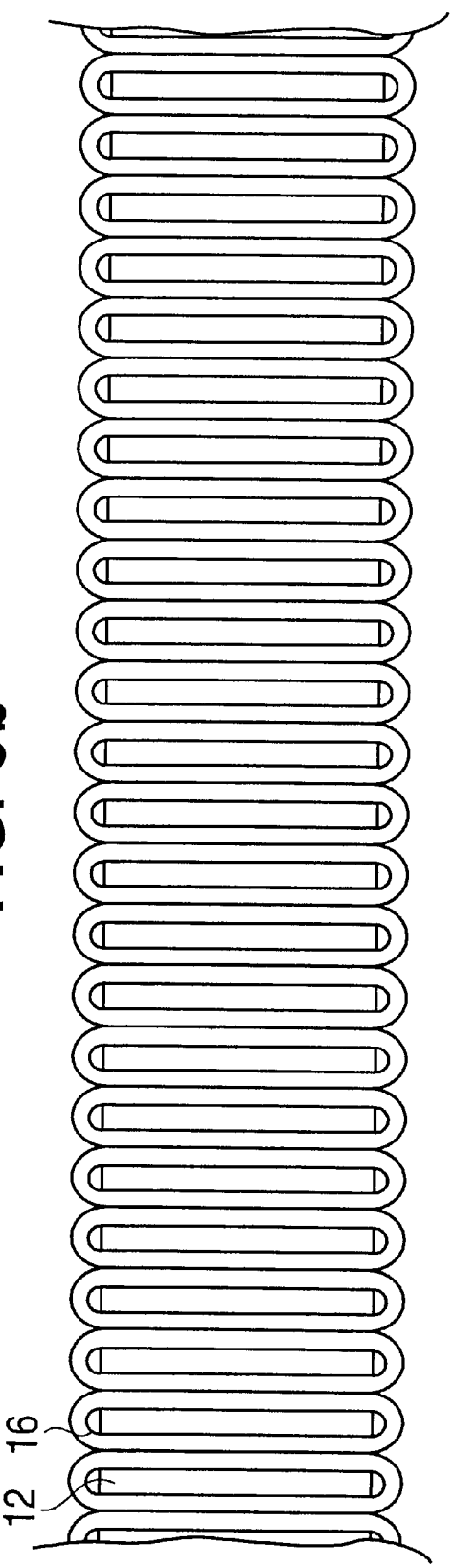
Figure 4:
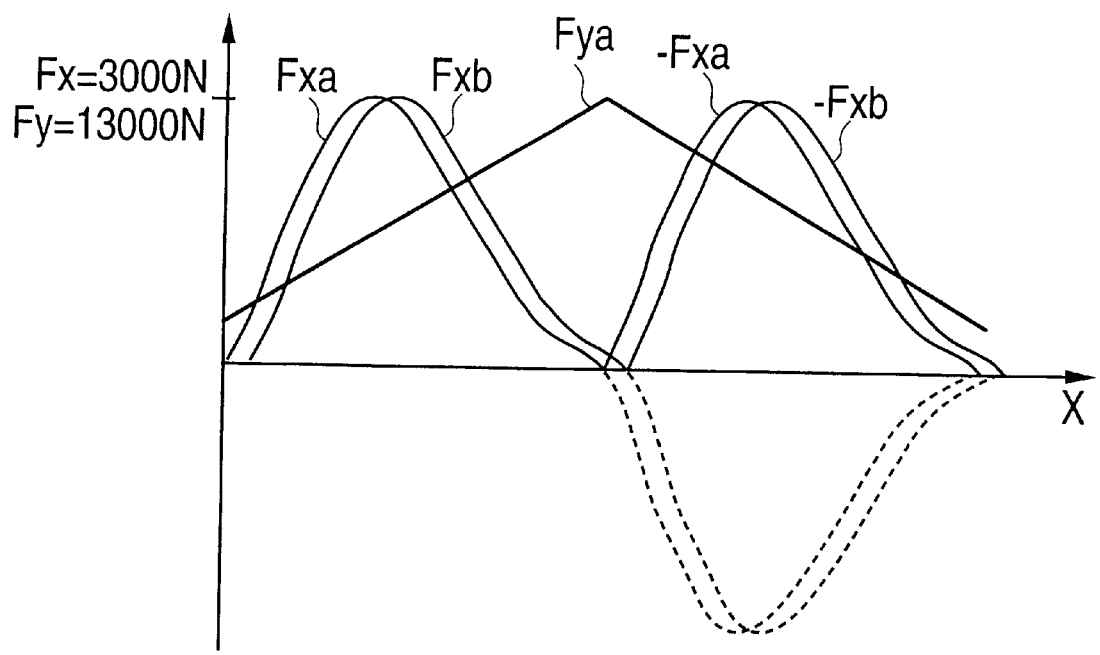
FIG. 4 illustrates the force effects of the motor.

For the sake of clarity, FIG. 3 only depicts a part of the stator windings 16 and rotor windings 28. The direction of the current (+or −) is shown in each slot and the magnetic fluxes completing their loops via the teeth 12 and 24, yoke parts 14 and 26 and air gap 20 are depicted with solid and broken lines, respectively.

The force generated by the stator winding in the direction of motion varies in the manner illustrated by curve $F_{xa}$ as a rotor tooth is moving past a stator tooth $T_a$. When it passes the next tooth $T_b$, a force effect as illustrated by curve $F_{xb}$ is produced. The windings are switched on phased with a corresponding timing difference. As the stator and rotor teeth are additionally removed according to the vernier principle, a uniform total force $F_x$ in the direction of motion is achieved. The broken line $F_{ya}$ describes the mutual attractive force perpendicular to the direction of motion between the stator tooth and the rotor tooth. In the case of a certain dimensioning applied, force components of the indicated magnitude were formed on the ordinate axis, $F_y$ being over four times as high as $F_x$.

Figure 5:
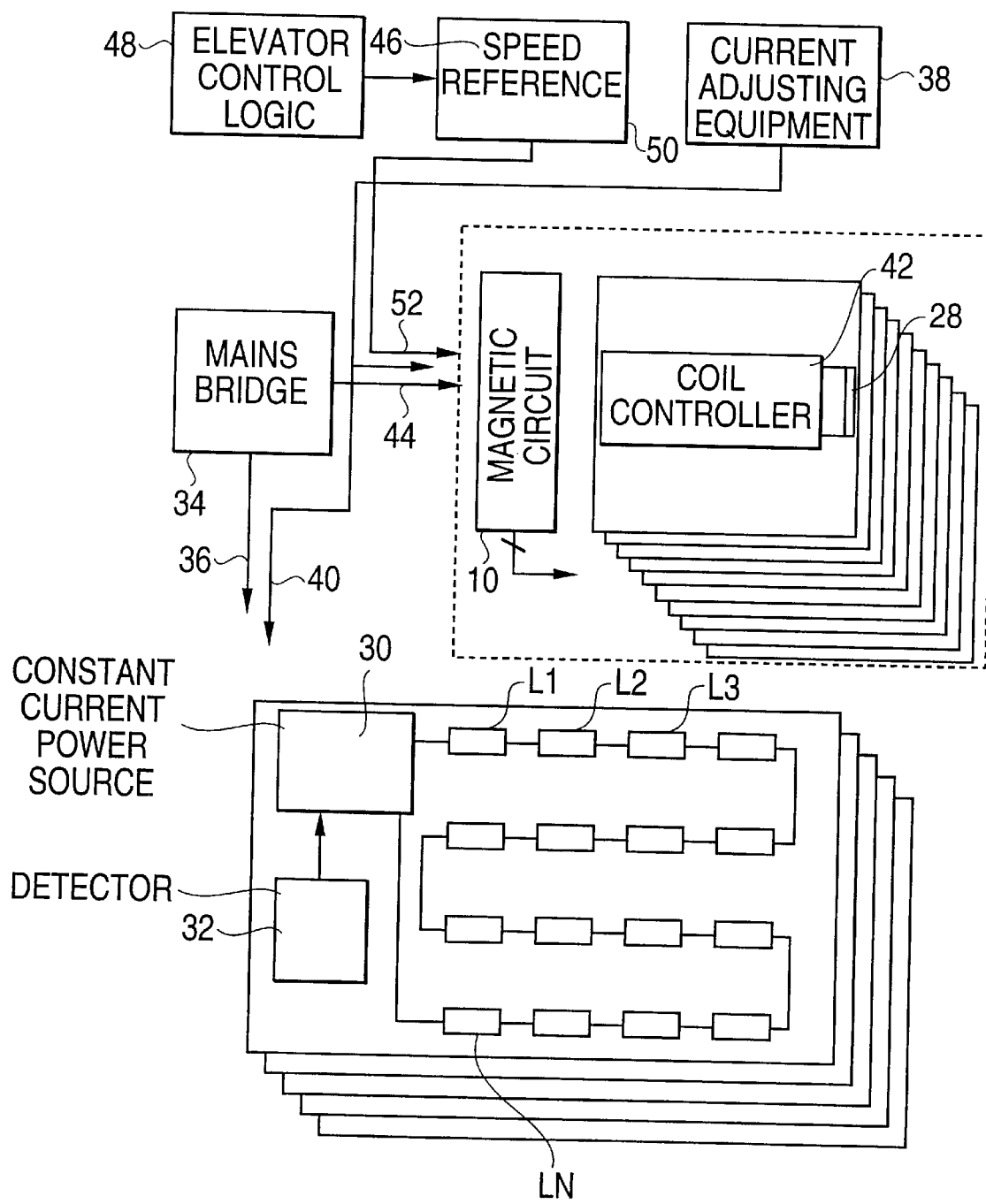
FIG. 5 illustrates the principle of control of the motor of the invention.

The basic circuit arrangement of the microflux motor and its control in an elevator drive is presented in FIG. 5. Mounted in the elevator shaft over its entire length is the stator, which comprises stator windings, i.e. shaft coils L1, L2, . . . LN, LN+1, LN+2, . . . ,LM, fitted in the slots between the stator teeth as explained above, shifted in phase in relation to the rotor teeth. Coils L1, . . . ,LN are connected in series and power is supplied to them from a single constant current power source 30. Along the total length of the elevator shaft there are several series-connected sets of shaft coils mounted one after the other, each set being fed by its own constant current power source. To enable each shaft coil to be switched on at the appropriate time, the elevator shaft is provided with detectors 32 which detect the position of the slide in the shaft and are used to switch on power to the appropriate portion of the shaft windings. It is not necessary to impose any exact requirements regarding the control of the shaft coils because it is enough to have the stator windings energised when the slide is over them. The constant current power sources for the shaft coils are fed from the electricity supply network by a mains bridge 34 via cables 36 mounted in the shaft. The current of the constant current power source 30 is also controlled by current adjusting equipment 38 via cables 40 mounted in the shaft. The control of the constant current power sources and therefore of the coils can be implemented in a manner known in itself and need not be described here in greater detail, but a person skilled in the art can design and construct the details of the equipment required by the invention in accordance with the principles taught by the invention.

Mounted on the elevator car is a slide 4 consisting of a toothed magnetic pack as illustrated by FIG. 3, which comprises e.g. ten rotor windings 28. Each rotor winding is controlled by its own coil controller 42, which are fed from the mains bridge 34 via car cables 44. The coil controller is controlled using the speed reference and actual speed value of the elevator. The speed reference 46 is generated in accordance with the elevator control logic 48 and the actual speed value 50 is generated by means of speed or position detectors from the motion of the elevator car or the slide. The control signals of the coil controller are taken to the car via a control cable 52. The coil controllers are so controlled that the force acting on the car is in accordance with the direction of motion and the car load.

The rotor windings can also be controlled using position and speed detectors. In this case, the elevator car is provided with a position detector for generating a position signal corresponding to the position of the elevator car and with an accelerometer for an acceleration controller. The coil controllers are controlled by the data provided by the position detector and the acceleration controller, so the position detector must provide sufficiently accurate position data to allow timely switching of the windings.

When the elevator is moving in the up direction, the motor windings must be so magnetised that, in addition to the perpendicular force between the stator and rotor that supports the car in the shaft, a force depending on the weight and velocity of motion of the car is generated. When the car is moving in the down direction, it can be braked electrically by supplying power into resistors or into the electricity supply network or into an energy reserve, such as a storage battery. However, the windings must produce a force between the stator and rotor that keeps the car fast on the shaft wall.

The control of a switched reluctance motor can be implemented in a corresponding manner, but the technical implementation differs considerably from that described above because only one of the motor halves is provided with windings and only these are controlled.

The supply of electricity of the shaft can be implemented in a partitioned fashion so that the coil controllers within each partition comprising a distance of a few meters have a separated power source connected to the electricity supply network.

The force $F_y$ acting on the car and slide in a direction perpendicular to the direction of motion is compensated and a constant air gap between the stator and rotor is maintained by supplying pressurised air into the air gap via a pipe system 27. This technique is known from pneumatic bearing technology and according to it the pressure difference causes air to flow from the nozzle in the pipe to the edges of the motor.

The energy required for the lifting movement of the elevator is larger than in elevator solutions using a counterweight. To reduce the power taken from the electricity supply network, energy reserves are used into which the energy developed by the elevator car moving downward is loaded.

The energy needed by the rotor moving together with the elevator car can also be supplied to the car using means other than a car cable. It is possible to provide the shaft with conductor rails from which electricity is passed to car supply cables via current collectors. Alternatively, the energy can also be supplied inductively, via radiation or from an accumulator mounted on the elevator car and charged during stoppages.

The invention has been described above by the aid of one of its embodiments. However, the presentation is not to be regarded as constituting a limitation of the sphere of protection of the patent, but its embodiments may vary within the limits defined by the following claims. In addition to the embodiments presented as examples, there are numerous alternative solutions regarding electricity supply, elevator control, motor construction, regeneration of braking energy and safety device arrangements. Although the motor has been described as comprising only one air gap, it is possible to use a motor with several air gaps and a corresponding number of stator and rotor pairs defining the air gaps and placed on one side of the elevator car, on opposite sides of the elevator car or on two or more sides perpendicular to each other. Likewise, a plurality of motors can be disposed at different angles to each other even though they are on the same side or on different sides of the elevator car.

What is claimed is:

1. An elevator comprising an elevator car and a drive machine, the drive machine comprising:

a linear motor primary circuit permanently fitted to a wall;

a linear motor secondary circuit fitted in conjunction with the elevator car and moving together with the elevator car, the elevator car being movable and supportable by the drive machine, the primary and secondary circuits of the linear motor comprise teeth placed successively in a direction of motion of the elevator, slots being provided between successive teeth and windings of the linear motor being fitted in the slots in both the primary and secondary circuits, magnetic flux induced by the windings completing its loop substantially through two adjacent teeth and a yoke part being provided between the teeth in the primary circuit and in the secondary circuit.

2. The elevator as defined in claim 1, further comprising pneumatic equipment for supplying pressurized air into a space between the primary circuit and the secondary circuit of the linear motor, an air gap between the primary circuit and the secondary circuit being regulatable by the pressurized air.

3. The elevator as defined in claim 1, further comprising a track for the elevator and control devices for supplying required power to the windings of the linear motor, the control devices for the primary circuit being distributed along a length of the track of the elevator with each winding being controlled separately.

4. The elevator as defined in claim 2, wherein the pneumatic equipment comprises a pneumatic pressure source and a pipe system with a nozzle, said nozzle being fitted in the air gap between the primary and secondary circuits of the linear motor.

5. The elevator as defined in claim 4, wherein the linear motor and the pneumatic equipment are disposed on two or more sides of the elevator car.

6. The elevator as defined in claim 2, wherein the linear motor and the pneumatic equipment are disposed on two or more sides of the elevator car.

7. The elevator as defined in claim 1, wherein the linear motor is disposed on two or more sides of the elevator car.

8. The elevator as defined in claim 1, wherein tooth pitch of the primary circuit and tooth pitch of the secondary circuit are implemented in accordance with the vernier principle.

9. The elevator as defined in claim 1, wherein at least one of the primary circuit and the secondary circuit are coated with a plastic film on a surface facing the air gap.

10. The elevator as defined in claim 1, wherein the wall in which the primary circuit of the linear motor is permanently fitted is a substantially vertical wall.

11. The elevator as defined in claim 1, wherein the secondary circuit of the linear motor is the only circuit on the elevator car in order to minimize weight of the elevator car.

12. The elevator as defined in claim 11, wherein the primary circuit of the linear motor is the only circuit on the wall.

* * * * *